Feb. 20, 1934.  A. L. LE PAGE  1,948,462
PANEL FASTENER
Filed March 21, 1933
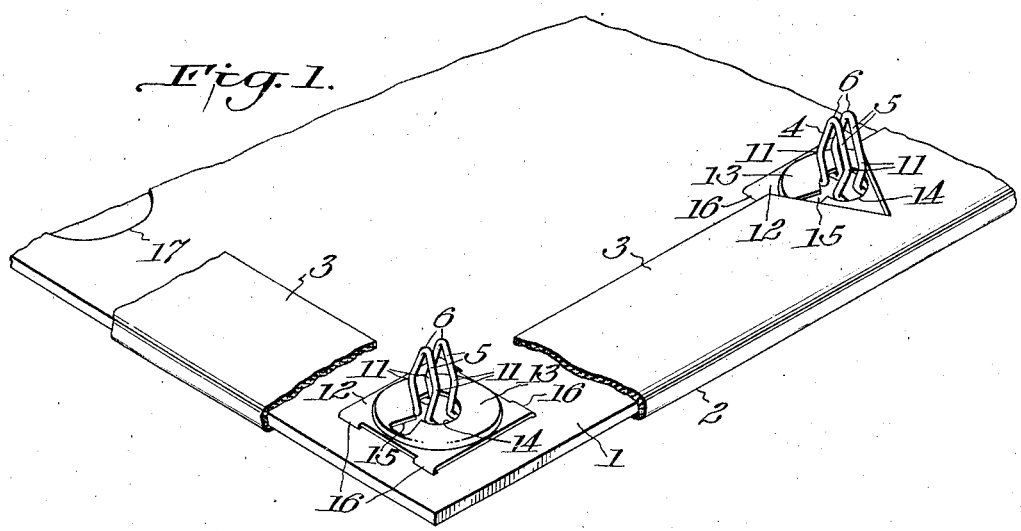
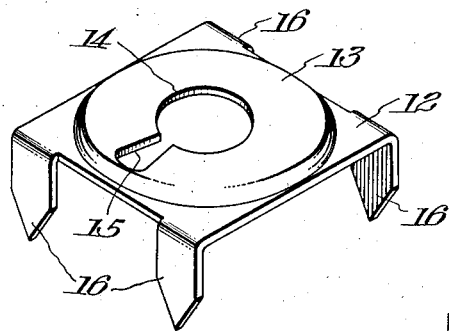
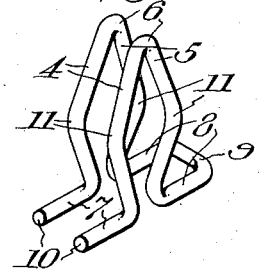
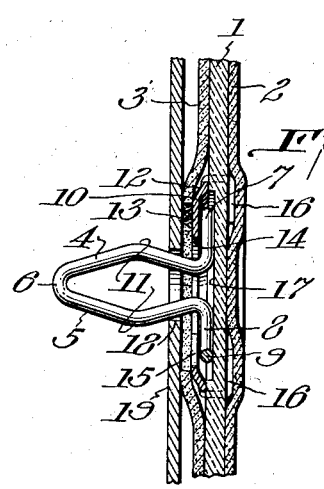

Patented Feb. 20, 1934

1,948,462

UNITED STATES PATENT OFFICE 1,948,462

PANEL FASTENER

Albert L. Le Page, Waterbury, Conn., assignor to Scovill Manufacturing Company, Waterbury, Conn., a corporation of Connecticut Application March 21, 1933. Serial No. 661,983

7 Claims. (Cl. 24—213)

This invention relates to separable fasteners, and particularly to the stud elements of such fasteners adapted for installation in assemblies whereby upholstered panels may be attached to the parts of automobile and other vehicle bodies, particularly to the doors thereof.

As is now will recognized, it is inexpedient to have the stud elements so applied to or assembled with the upholstery panels that they form, in effect, an integral part thereof prior to the time of installation of the panels, for the reason that their protrusion from the panels is apt to deface the upholstery of the panels when they are piled or stacked, as is customary, prior to such installation.

The object of the invention is to provide a panel fastener the stud element of which may be assembled with the panel just prior to its time of installation; the means for assembling the stud element with the panel being such as to facilitate its assembly with the panel but make unlikely its separation therefrom after assembly. Moreover, the stud element and its attaching part are so relatively designed that the stud element may be capable of the lateral shifting or floating movement which has become a characteristic of devices of this kind.

The invention contemplates a panel fastener including a stud member having a shank and a base, and an attaching plate for assembling this stud member with a suitable upholstery support or backing, this attaching plate provided with an aperture having a lateral slot or extension and substantially of keyhole shape, and the stud member adapted to be arranged with its base lying between the attaching plate and the support, and capable of being so arranged by insertion of portions of its base through said aperture and through the slot or extension thereof, as will be explained hereinafter more fully and finally claimed.

In the accompanying drawing illustrating the invention, in the several figures of which like parts are similarly designated, Figure 1 is a fragmentary perspective view of a portion of an upholstery panel illustrating the fastener assembly of the invention, and having portions of the upholstery material removed to disclose the underlying fastener parts. Fig. 2 is an enlarged perspective view of the attaching plate. Fig. 3 is an enlarged perspective view of the stud member. Fig. 4 is a fragmentary sectional elevation showing the complete assembly of upholstery panel, door flange or the like, and cooperating fastener elements.

As is well known, the upholstery panels referred to, particularly door panels, such as illustrated in Fig. 1, comprise a support or backing 1 of fiberboard, or other appropriate relatively stiff material, to the outer or normally exposed surface of which is applied a covering of upholstery material 2 the edges of which are extended around the borders of the panel and lap over upon the back of the panel as indicated at 3. The upholstery material 2 may be cemented or otherwise appropriately attached to the support or backing 1, as is customary.

The stud members of the fastener elements of this invention are intended to be arranged at suitable spaced intervals around the panel upon the rear or normally concealed face thereof and adjacent to the edge, and these stud members are designed to be engaged with appropriate complemental socket members, usually in the form of holes punched in the flange of the door.

The stud member of the invention comprises a length of suitable material, such as spring or other stiff wire, bent to such shape as to provide a shank comprising two similar members each having a pair of legs 4 and 5 connected at their leading ends, as shown at 6, to furnish a certain amount of resiliency, and having their other ends provided with opposite lateral extensions 7 and 8 respectively to form a base for the stud member. The extensions 8 are connected by a loop 9, and the extensions 7 terminate in free ends 10 which normally stand apart and may be drawn together due to the resiliency of the loop 9.

The legs 4 and 5 are bent intermediate their ends to provide offsets 11 which serve to engage the complemental socket with a snap action.

It will be apparent that the relatively broad base provided by the extensions 7 and 8 and loop 9 will furnish an extensive bearing for the stud member upon its support and will prevent tipping. The attaching plate 12 is preferably substantially rectangular in plan and is provided with a centrally arranged substantially circular boss 13, which furnishes between the plate and the support or backing 1 a space for the reception of the base of the stud member, as will later appear. The plate 12 is provided, in its boss 13, with an aperture 14 of greater size than the shank of the stud member, so that when the stud member is assembled with its shank extending through the aperture 14, the desired lateral shifting or floating movement of the stud member with respect to the upholstery panel is provided for. The aperture 14 is formed with a lateral slot or extension 15, and the aperture 14 and its slot or extension 15 form an opening of substantially keyhole shape and preferably of less extent in any direction than the greatest dimension of the base of the stud member. Prongs 16, preferably integral with the plate 12, are provided for attaching the plate to the support or backing 1 by passing them through the backing and clinching them against its outer face, as illustrated in Fig. 4, but other appropriate attaching means may be substituted for these prongs, if desired.

In the fastener assembly illustrated in the drawing, the boss 13 of the attaching plate 12 is not so deep as to provide between its inner face and the adjacent face of the backing member or support 1 sufficient space for free reception of the base of the stud member. This prevents such an extension of the boss 13 beyond the inner or concealed face of the backing member or support 1 as to make the panel assembly bulky and prevent it from closely and smoothly engaging the adjacent face of the door frame. In order to provide adequate space between the inner face of the boss 13 and the adjacent face of the backing or support 1 the backing may be provided with a depression 17. However, this depression may be omitted if desired, and the boss offset sufficiently to provide adequate clearance between its inner face and the adjacent face of the backing or support 1 to accommodate the base of the stud member.

It will be understood from the foregoing that the upholstery panels, when ready for assembly with the doors or other vehicle body parts for which they are designed, are covered with the upholstery fabric, and have applied to them the attaching plates 12. Just prior to their assembly with the body parts the stud members are assembled with the attaching plates by first passing their loops 9 and extensions 8 beneath the bosses 13 by way of the apertures 14 and into the spaces provided between the plates and the support or backing 1. Then their extensions 7 are passed, successively, through the slots or extensions 15 of the apertures 14 with a rotative movement so that they also are introduced beneath the plates, thus providing for the arrangement of all of the parts forming the bases of the stud members beneath the plates, and consequently between the plates and the backing or support.

Although the stud members may have their bases thus introduced beneath the attaching plates with relative ease, once they have been so introduced it is very difficult to remove them, and their accidental disengagement is practically impossible. In order, however, to guard against such accidental disengagement of the stud members, they are preferably so rotated with respect to the plates that the extensions 7 of their bases will be out of line with the slots 15 of the apertures 14.

It will be noted that the slots or extensions 15 of the apertures 14 are of peculiar shape. The sides of these slots lie substantially on radii of the apertures 14, and thus although these slots provide relatively narrow openings where they join the apertures 14, their ends remote from such apertures are relatively broad. This particular conformation of the slots 15 facilitates introduction therethrough of the extensions 7 of the stud members by the rotative movement referred to, for the reason that the extensions 7 may, before introduction through the slots 15, be appropriately aligned therewith by compressing their free ends 10 thus drawing their extensions 7 together. However, after the extensions 7 are in position beneath the plate, they are permitted to separate and their spacing, when thus separated, makes very unlikely, and in fact, hardly possible, their alignment with the slots 15. Of course, the stud members can be manually disengaged from their attaching plates by compressing the extensions 7 of their bases, and this is desirable, but, as stated, accidental escape of the stud members from their attaching plates is practically impossible.

Referring to Fig. 4, it will be seen that when the stud members are engaged with the holes 18 in the door frame or the like 19, which form their complemental socket elements, their offsets 11 pass through same with a snap action and their shanks engage with these openings. The snap action of the stud members is permitted by the resiliency of their parts 6 and 9, as they may be compressed in two directions due to their connection by these parts. Moreover, as the shanks are of considerable length between the offsets 11 and their bases, they may be engaged with complemental socket holes in materials of various thicknesses, and due to the formation by means of which they may be compressed, they may be engaged with socket holes of different diameters with equal efficiency.

The formation of the shanks of the stud members with four legs 4, 4 and 5, 5 provides for a four-point engagement or contact of the stud members with their complemental socket holes. This is desirable in that it provides a relatively extended and rigid bearing of the stud members in their complemental socket holes.

Various changes and modifications are considered to be within the spirit of the invention and the scope of the following claims.

What I claim is:—

1. In a separable fastener element, a stud member having a shank and a base composed of opposite lateral extensions, and an attaching plate whereby said stud member may be assembled with a support, said plate provided with an opening comprising in all an aperture having a lateral extension, said opening terminating within the confines of said plate and of less extent in any direction than the greatest dimension of said base, the opposite lateral extensions of said base providing a portion insertible through said aperture and a portion insertible through the extension of said aperture, whereby by such insertion said stud member may be assembled with said plate from the exposed face thereof with the base lying between said plate and support and the shank extending through said aperture.

2. In a separable fastener element, a stud member formed of a length of material bent to form a shank and a base, said base including two portions connected with said shank, one portion comprising a laterally extending loop and the other portion comprising laterally extending free ends, and an attaching plate whereby said stud member may be assembled with a support, said attaching plate provided with an aperture having a lateral extension, said stud member capable of assembly with said plate from the exposed face thereof with its base lying between said plate and support and its shank extending through said aperture by insertion of the loop through said aperture and the free ends through said extension.

3. In a separable fastener element, a stud member comprising a shank composed of a pair of similar elements each having two legs connected at their leading ends and provided at their other ends with lateral extensions forming a base, two of said extensions being connected by a loop and the other two extensions being free, and an attaching plate whereby said stud member may be assembled with a support, said plate provided with an aperture having a lateral extension, said aperture and its extension adapted to accommodate the loop and free extensions of said base respectively, to permit passage of the base therethrough and into position between said plate and support.

4. In a separable fastener element, a stud member having a shank and a base formed of opposite lateral extensions, and an attaching plate for assembling said stud member with a support, said plate provided with a keyhole-shaped opening comprising in all an aperture having a lateral extension, said opening terminating within the confines of the plate, said plate provided also with a boss furnishing a space between it and said support and aperture, said opening located in said boss and being of less extent in any direction than the greatest dimension of said base, and said base formed for insertion between said plate and support by passing its lateral extensions through said aperture and the extension thereof, respectively, from the exposed face of said plate.

5. In a separable fastener element, a stud member comprising a shank and a base formed of opposite lateral extensions, one of said lateral extensions including free lateral portions capable of movement toward and away from each other, and an attaching plate for assembling said stud member with a support, said plate provided with a substantially keyhole-shaped opening comprising an aperture and communicating slot, said opening lying wholly within the confines of said plate and of less extent in any direction than the greatest dimension of said base, said stud member capable of assembly with its base lying between said plate and support by successively passing the free portions of said lateral extension through the slot of said keyhole-shaped opening.

6. A stud member for separable fasteners, having a resilient shank comprising two similar members each of which has a pair of legs joined at their leading ends, each of said legs terminating in a lateral extension projecting from opposite sides to provide a base, two of said extensions being joined and the other two extensions being free and spaced apart and capable of relative movement toward and away from each other.

7. A stud member for separable fasteners, having a resilient shank comprising two similar members each of which has a pair of legs joined at their leading ends, each of said legs terminating in a lateral extension projecting from opposite sides to provide a base, two of said extensions being joined by a loop and the other two extensions being free and spaced apart and capable of relative movement.

ALBERT L. LE PAGE.